(12) United States Patent
Sugatani et al.

(10) Patent No.: US 11,229,971 B2
(45) Date of Patent: Jan. 25, 2022

(54) THREE-DIMENSIONAL LAMINATING AND SHAPING APPARATUS AND LAMINATING AND SHAPING METHOD

(71) Applicant: ADVANTEST CORPORATION, Tokyo (JP)

(72) Inventors: Shinji Sugatani, Saitama (JP); Shigeki Nishina, Saitama (JP); Jun Matsumoto, Saitama (JP); Masahiro Takizawa, Saitama (JP); Minoru Soma, Saitama (JP); Akio Yamada, Saitama (JP)

(73) Assignee: ADVANTEST CORPORATION, Tokyo (JP)

( * ) Notice: Subject to any disclaimer, the term of this patent is extended or adjusted under 35 U.S.C. 154(b) by 485 days.

(21) Appl. No.: 16/127,225

(22) Filed: Sep. 11, 2018

(65) Prior Publication Data
US 2019/0118287 A1    Apr. 25, 2019

(30) Foreign Application Priority Data

Oct. 19, 2017    (JP) .............................. JP2017-202962

(51) Int. Cl.
*B23K 15/00*    (2006.01)
*B28B 1/00*    (2006.01)
(Continued)

(52) U.S. Cl.
CPC .......... *B23K 15/0086* (2013.01); *B22F 10/20* (2021.01); *B23K 15/002* (2013.01);
(Continued)

(58) Field of Classification Search
None
See application file for complete search history.

(56) References Cited

U.S. PATENT DOCUMENTS 3,840,749 A * 10/1974 O'Keeffe ............ H01J 37/3045
250/492.1
3,849,659 A * 11/1974 O'Keeffe ............... B82Y 40/00
250/492.1
(Continued)

FOREIGN PATENT DOCUMENTS

CN    102147431 A    8/2011
CN    105813827 A    7/2016
(Continued)

OTHER PUBLICATIONS

Office Action for European Patent Application No. 18192172.7, issued by the European Patent Office dated Nov. 12, 2019.
(Continued)

*Primary Examiner* — Ibrahime A Abraham
*Assistant Examiner* — Gyounghyun Bae

(57) ABSTRACT

Provided is a three-dimensional laminating and shaping apparatus 100 including a column unit 200 that is configured to output an electron beam EB and deflect the electron beam EB toward the front surface of a powder layer 32, an insulating portion that electrically insulates a three-dimensional structure 36 from a ground potential member, an ammeter 73 that is configured to measure the current value indicative of the current flowing into the ground after passing through the three-dimensional structure 36, a melting judging unit 410 that is configured to detect that the powder layer 32 is melted based on the current value measured by the ammeter 73 and generate a melting signal, and a deflection controller 420 that is configured to receive the melting signal to determine the condition for the irradiation with the electron beam.

9 Claims, 8 Drawing Sheets

(51) Int. Cl.
*B28B 17/00* (2006.01)
*B33Y 10/00* (2015.01)
*B33Y 30/00* (2015.01)
*B33Y 50/02* (2015.01)
*B29C 64/268* (2017.01)
*B29C 64/153* (2017.01)
*B22F 10/20* (2021.01)
*B23K 15/02* (2006.01)
*B33Y 40/00* (2020.01)
*B22F 10/30* (2021.01)

(52) U.S. Cl.
CPC ...... *B23K 15/0013* (2013.01); *B23K 15/0026* (2013.01); *B28B 1/001* (2013.01); *B28B 17/0081* (2013.01); *B29C 64/153* (2017.08); *B29C 64/268* (2017.08); *B33Y 10/00* (2014.12); *B33Y 30/00* (2014.12); *B33Y 50/02* (2014.12); *B22F 10/30* (2021.01); *B22F 2999/00* (2013.01); *B23K 15/02* (2013.01); *B33Y 40/00* (2014.12)

(56) References Cited

U.S. PATENT DOCUMENTS

| | | | | |
|---|---|---|---|---|
| 4,199,689 | A * | 4/1980 | Takigawa | H01J 37/241 219/121.12 |
| 5,830,612 | A * | 11/1998 | Yamada | B82Y 40/00 430/30 |
| 7,019,293 | B1 * | 3/2006 | Hamada | G01B 15/00 250/310 |
| 7,454,262 | B2 | 11/2008 | Larsson | |
| 10,099,289 | B2 | 10/2018 | Jonasson | |
| 10,580,351 | B2 | 3/2020 | Shinichi | |
| 10,640,710 | B2 | 5/2020 | Kotaro | |
| 2005/0134297 | A1 * | 6/2005 | Tezuka | G01R 13/347 324/754.22 |
| 2005/0279935 | A1 * | 12/2005 | Shur | G01N 23/225 250/310 |
| 2006/0202119 | A1 * | 9/2006 | Yamada | H01J 37/256 250/310 |
| 2013/0055568 | A1 | 3/2013 | Karl-Heinz | |
| 2015/0017054 | A1 | 1/2015 | Andreas | |
| 2015/0273622 | A1 | 10/2015 | Manabe | |
| 2017/0144253 | A1 * | 5/2017 | Martinsen | B33Y 40/00 |
| 2017/0154750 | A1 * | 6/2017 | Sato | B22F 10/30 |
| 2017/0341183 | A1 * | 11/2017 | Buller | B29C 64/153 |
| 2018/0154484 | A1 * | 6/2018 | Hall | B23K 26/034 |

FOREIGN PATENT DOCUMENTS

| | | |
|---|---|---|
| CN | 206122695 U | 4/2017 |
| EP | 2544840 A1 | 1/2013 |
| EP | 2832474 A1 | 2/2015 |
| JP | 2000124276 A | 4/2000 |
| JP | 2015174423 A | 10/2015 |
| JP | 2015182419 A | 10/2015 |
| JP | 2016060093 A | 4/2016 |
| JP | 2017001014 A | 1/2017 |
| WO | 2017084811 A1 | 5/2017 |
| WO | 2017163404 A1 | 9/2017 |

OTHER PUBLICATIONS

Extended European Search Report issued for counterpart European Application No. 18192172.7, issued by the European Patent Office dated Feb. 21, 2019.
Office Action issued for counterpart Japanese Application No. 2017-202962, issued by the Japan Patent Office dated May 25, 2021 (drafted on May 18, 2021).
Notice of First Office Action for Patent Application No. 201810893355. 6, issued by The National Intellectual Property Administration of the People's Republic of China dated Sep. 3, 2021.
Qi Haibo et al.,"Electron beam selective melting of 316L stainless steel powder",N 11-2223/NJ Tsingh ua Univ (Sci &Tech ), 2007, vo l. 47, No. 111/36 1941-1944.

* cited by examiner

THREE-DIMENSIONAL LAMINATING AND SHAPING APPARATUS AND LAMINATING AND SHAPING METHOD

BACKGROUND

1. Technical Field

The present invention relates to a three-dimensional laminating and shaping apparatus and a laminating and shaping method.

2. Related Art

A three-dimensional laminating and shaping apparatus is known that is configured to irradiate, with an electron beam, a predetermined area of a powder layer that is made of a metal material and the like so that a portion of the powder layer melts and then becomes combined with an underlying structure. In this way, a cross-section layer is formed and such cross-section layers are accumulated to finally shape a three-dimensional structure (see, for example, Patent Documents 1, 2 and 3).

PRIOR ART DOCUMENTS

Patent Documents

Patent Document 1: U.S. Pat. No. 7,454,262
Patent Document 2: Japanese Patent Application Publication No. 2015-193866
Patent Document 3: Japanese Patent Application Publication No. 2015-182419

As for a conventional three-dimensional laminating and shaping apparatus, a user of the apparatus sets the conditions under which the irradiation with the electron beam is carried out by referring to the conditions of the powder layer such as the source material and thickness of the powder layer and the conditions of the electron beam such as the accelerating voltage and the current value (see, for example, Patent Documents 1 and 2).

In reality, however, both the conditions of the powder layer and the conditions of the electron beam may change from their preset values while three-dimensional laminating and shaping is carried out. For example, a plurality of powder layers may have different thicknesses respectively or depending on where the powder layers are located, or the beam current value may vary over time. For these reasons, the user of the apparatus is required to reset the conditions under which the irradiation with the electron beam is carried out for the apparatus in accordance with such changes (see Patent Document 3).

The objective of the present invention is to provide a three-dimensional laminating and shaping apparatus that can perform irradiation with an electron beam EB with it being possible to determine the irradiation conditions for the electron beam on its own in such a manner that the powder layer can be surely melted and combined, and a laminating and shaping method.

SUMMARY

An aspect of the following disclosure provides a three-dimensional laminating and shaping apparatus to laminate and shape a three-dimensional structure. The three-dimensional laminating and shaping apparatus includes a powder feeding unit configured to feed a powder layer of an electrically conductive material, an electron beam column configured to output an electron beam and deflect the electron beam toward a front surface of the powder layer, an insulating portion that is in contact with the three-dimensional structure and electrically insulates the three-dimensional structure from a ground potential member, an ammeter connected between the three-dimensional structure and the ground potential member and configured to measure a current value of a current flowing into the ground potential member after passing through the three-dimensional structure, a melting judging unit configured to, based on the current value measured by the ammeter, detect that the powder layer is melted and generate a melting signal, and a deflection controller configured to receive the melting signal and determine a condition of the irradiation with the electron beam.

Furthermore, a laminating and shaping method using the above-described three-dimensional laminating and shaping apparatus is also provided. The laminating and shaping method includes, by the powder feeding unit, feeding the powder layer, by the electron beam column, irradiating the powder layer with the electron beam, by the ammeter, measuring the current value of the current flowing into the ground potential member after passing through the three-dimensional structure, by the melting judging unit, generating the melting signal when a difference between a current value of the electron beam irradiating the powder layer and the current value measured by the ammeter becomes less than or equal to a predetermined reference value, and by the deflection controller, setting a condition of the irradiation based on the melting signal.

The summary clause does not necessarily describe all necessary features of the embodiments of the present invention. The present invention may also be a sub-combination of the features described above.

DESCRIPTION OF EXEMPLARY EMBODIMENTS

Preferred embodiments of a three-dimensional laminating and shaping apparatus 100 according to the present invention are described in detail with reference to FIGS. 1 to 7.

(1) Overview of an Embodiment

Figure 1:
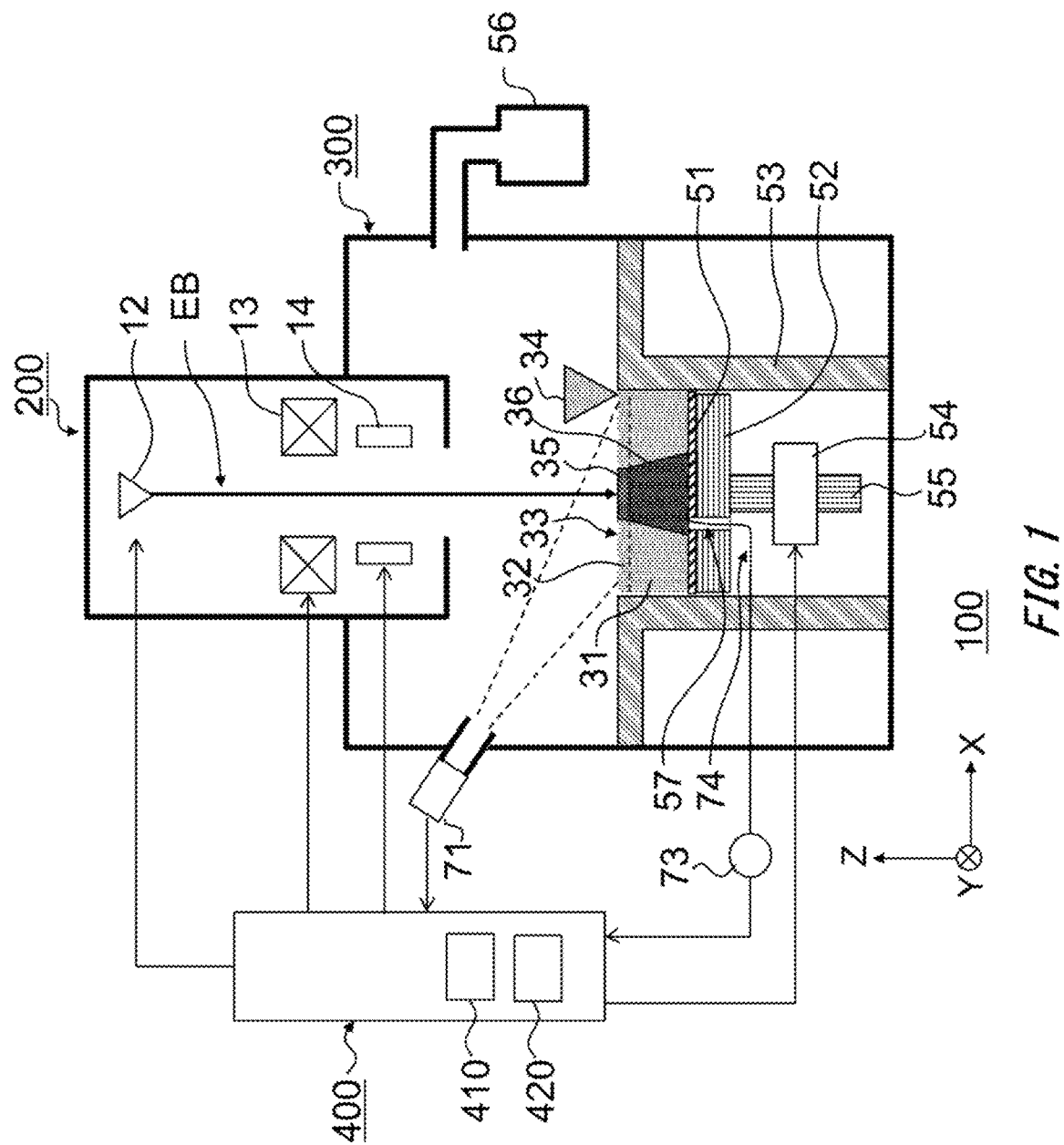
FIG. 1 is a block diagram showing an exemplary structure of a three-dimensional laminating and shaping apparatus 100.

FIG. 1 shows an exemplary structure of a three-dimensional laminating and shaping apparatus 100 relating to an embodiment. The three-dimensional laminating and shaping apparatus 100 includes a column unit 200 that is configured to output an electron beam EB and deflect the electron beam EB toward the front surface of a powder layer 32, an insulating portion 51 that electrically insulates a three-dimensional structure 36 from a ground potential member, an ammeter 73 that is configured to measure the value of the current flowing into the ground potential member after passing through the three-dimensional structure 36, a melting judging unit 410 that is configured to detect that a powder layer 32 is melted based on the current value measured by the ammeter 73 and generate a melting signal, and a deflection controller 420 that is configured to receive the melting signal to determine the condition for the irradiation with the electron beam.

(2) Details of the Embodiment

FIG. 1 shows an exemplary structure of the three-dimensional laminating and shaping apparatus 100 relating to the present embodiment. The three-dimensional laminating and shaping apparatus 100 irradiates, with the electron beam EB, the powder layer 32 that is formed, for example, by powders of metal materials to melt and combine a portion of the powder layer 32 so that a cross-section layer 35 is formed and such cross-section layers 35 are laminated to shape a three-dimensional structure 36.

The three-dimensional laminating and shaping apparatus 100 includes the column unit 200, a shaping unit 300, and a controller 400. The column unit 200 is positioned so that the electron beam EB output from the column unit 200 can irradiate the powder layer 32, which is maintained within the shaping unit 300. The electron beam EB is controlled by the controller 400 and irradiates a predetermined area of the powder layer 32.

The column unit 200 has an electron source 12, which is controlled by the controller 400. The electron source 12 generates electrons using heat or electric fields. The electrons generated by the electron source 12 are accelerated in the −Z direction by a predetermined accelerating voltage (for example, 60 KV) to be output in the form of the electron beam EB.

The column unit 200 has an electron lens 13, which is controlled by the controller 400. The electron lens 13 controls the electron beam EB to converge on the front surface 33 of the powder layer 32. The electron lens 13 is, for example, constituted by a coil wound around the axis of the lens and a magnetic element (yoke) that surrounds the coil and has a space therein axially symmetrical with respect to the axis of the lens.

The column unit 200 has a deflector 14, which is controlled by the controller 400. The deflector 14 deflects the electron beam EB to designate the position irradiated with the electron beam EB in the in-plane directions (the X and Y directions) of the powder layer 32. The deflector 14 has, for example, two pairs of deflection coils, one of which includes deflection coils facing each other in the X-axis direction with the Z-axis being sandwiched therebetween and the other includes deflections coils facing each other in the Y-axis direction with the Z-axis being sandwiched therebetween. Here, the Z-axis coincides with the path along which the electron beam EB travels.

The powder layer 32, which is to be irradiated with the electron beam EB output from the column unit 200, is maintained by a stage 52 and a side wall unit 53 included in the shaping unit 300. The stage 52 and the side wall unit 53 flattens the powder layer 32, which is made of powders of metal materials fed from a powder feeding unit 34, in such a manner that a front surface 33 of the powder layer 32 is substantially parallel to the upper surface of the stage 52 and maintains the resulting powder layer 32.

When melted by the irradiation with the electron beam, the powder layer 32 is combined with the upper edge portion of the three-dimensional structure 36 that has already been laminated. In this way, a cross-section layer 35 is formed. The newly formed cross-section layer 35 extends the three-dimensional structure 36 in the Z-axis direction. Excluding the cross-section layer 35 that is laminated on the three-dimensional structure 36, the remaining powder layer 32 is left and accumulated in the form of the powders 31 of the metal materials around the three-dimensional structure 36.

A insulating portion 51, which is formed by an insulator in the form of a thin plate, is provided between the three-dimensional structure 36 and the upper surface of the stage 52. The insulating portion 51 electrically insulates the three-dimensional structure 36, which is formed by melting metal materials from the stage 52. The insulating portion 51 is made of insulating ceramic materials, for example. In place of providing the insulator in the form of a thin plate, the stage 52 may be formed by the insulating portion 51, which is made of insulating ceramic materials, for example. Any configurations may be acceptable as long as the three-dimensional structure 36 is electrically insulated from the ground potential member.

The insulating portion 51 and the stage 52 respectively have through holes 57 at substantially the same position within the X-Y plane. The through holes 57 are openings to allow a cable 74 to pass therethrough. The cable 74 is connected at one end thereof to a terminal that is in electrical contact with the three-dimensional structure 36 and at the other end thereof to the input terminal of the ammeter 73. This allows the ammeter 73 to measure the beam current that flows into a ground potential member (earth) after passing through the three-dimensional structure 36.

The stage 52 is moved in the Z-axis direction (the height direction) by a driving unit 54 and a driving rod 55, which are controlled by the controller 400. The stage 52 is moved in the Z-axis direction along the inner side surfaces of the side wall unit 53, which is, for example, a cylindrical member extending in the Z-axis direction.

The height of the stage 52 in the Z-axis direction is set such that the front surface 33 of the powder layer 32 is maintained at substantially the same height in the Z-axis direction while the powder layer 32 is irradiated with the electron beam. In other words, after the cross-section layer 35 is laminated on the three-dimensional structure 36, the stage 52 is moved down every time a new powder layer 32 is fed to cancel the thickness of the new powder layer 32 in the Z-axis direction.

The shaping unit 300 has an evacuating unit 56. The evacuating unit 56 evacuates the path along which the electron beam travels in the three-dimensional laminating and shaping apparatus 100. The evacuating unit 56 evacuates the internal space of the column unit 200 and the space in the vicinity of the front surface 33 of the powder layer 32 within the shaping unit 300 to realize a predetermined level of vacuum. This is because the electron beam loses its energy when colliding with gas molecules in the air.

The three-dimensional laminating and shaping apparatus 100 relating to the present embodiment includes, in the shaping unit 300, a radiation thermometer 71 and an ammeter 73 in order to monitor the state of the powder layer 32 during the irradiation with the electron beam EB. The radiation thermometer 71 is monitoring means provided even in a conventional three-dimensional laminating and shaping apparatus.

The radiation thermometer 71 detects the radiation of the heat from the front surface 33 of the powder layer 32 to measure the front surface temperature of the powder layer 32. In other words, the radiation thermometer 71 is capable of dividing the front surface 33 of the powder layer 32 into pixel regions of a predetermined size and measuring the temperature in the respective pixel regions in parallel.

Figure 7:
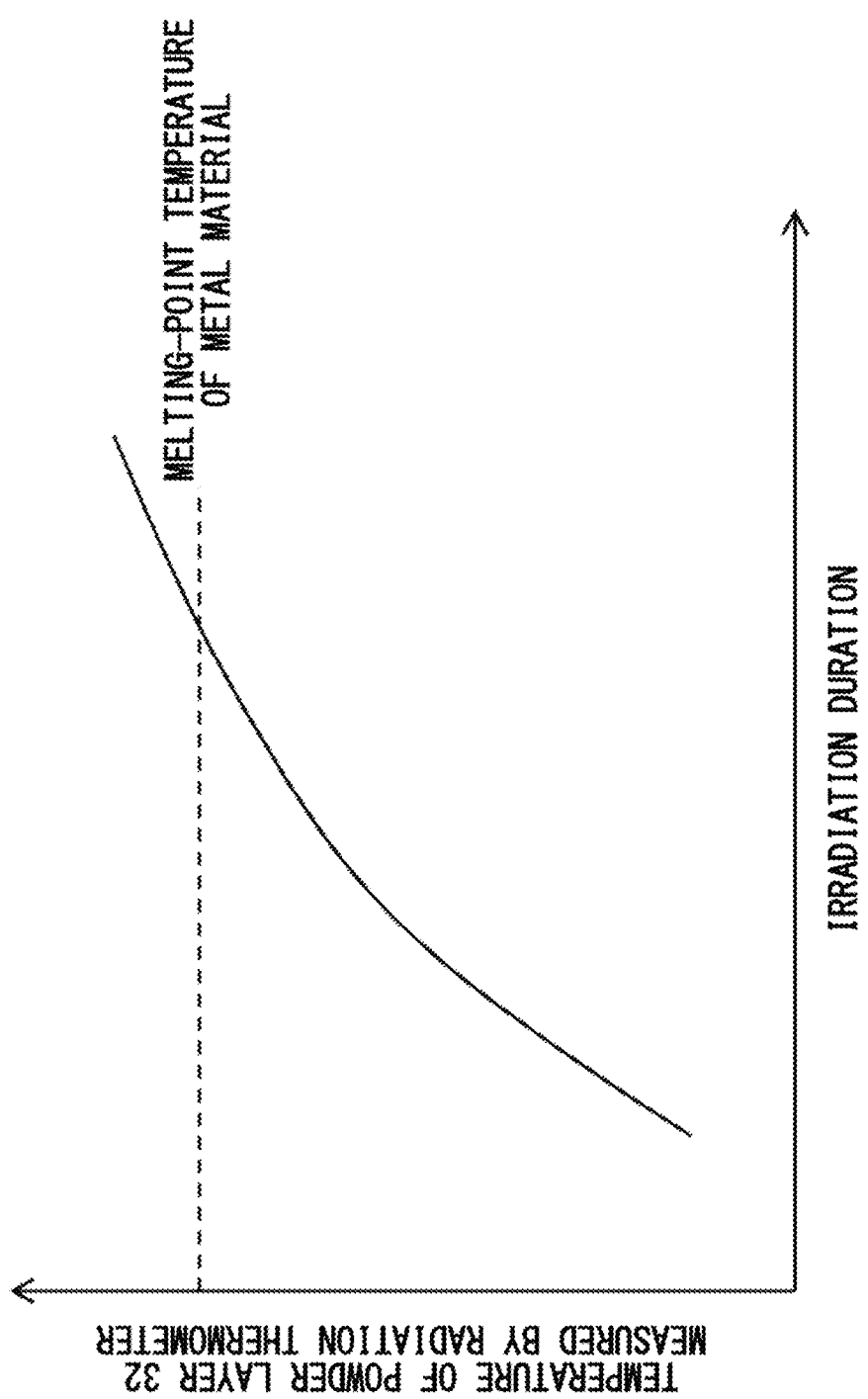
FIG. 7 is a graph showing the change in the temperature of the front surface of the powder layer 32 that is measured by a radiation thermometer 71.

FIG. 7 is a graph showing how the front surface temperature of the powder layer 32, which is measured by the radiation thermometer 71, varies. The horizontal axis represents the irradiation duration, during which a predetermined area of the front surface 33 of the powder layer 32 is continuously irradiated with the electron beam EB. The vertical axis represents the temperature of the pixel region in which the highest temperature is measured on the front surface of the powder layer 32.

The front surface temperature of the powder layer 32 rises in accordance with the irradiation duration of the electron beam EB. When a predetermined irradiation duration elapses, the front surface temperature of the powder layer 32 exceeds the melting-point temperature. Accordingly, at least a portion of the powder layer 32 is melted. The measured results shown in FIG. 7, however, indicate that it is difficult to determine the point of time during the irradiation at which the area of the powder layer 32 irradiated with the electron beam EB is melted and combined with the upper edge of the three-dimensional structure 36. The front surface temperature of the powder layer 32, which is measured by the radiation thermometer 71, continuously rises in accordance with the irradiation duration of the electron beam EB and does not sensitively indicate the change in the state of the powder layer 32.

The three-dimensional laminating and shaping apparatus 100 relating to the present embodiment includes the ammeter 73 in the shaping unit 300 as shown in FIG. 1. The ammeter 73 is configured to measure the value of the beam current that flows into the ground potential member after passing through the three-dimensional structure 36, out of the electron beam EB irradiating the powder layer 32. The ammeter 73 sends to the controller 400 the measured results of the value of the beam current flowing into the ground potential member after passing through the three-dimensional structure 36.

The melting judging unit 410 included in the controller 400 judges that the powder layer 32 is melted and combined based on the measured results from the ammeter 73. The deflection controller 420 included in the controller 400 controls the condition for the irradiation with the electron beam EB in response to the result of the judgment made by the melting judging unit 410.

The following describes how the irradiation with the electron beam is performed in the three-dimensional laminating and shaping apparatus 100 and how the ammeter 73, the melting judging unit 410 and the deflection controller 420 operate.

Figure 2:
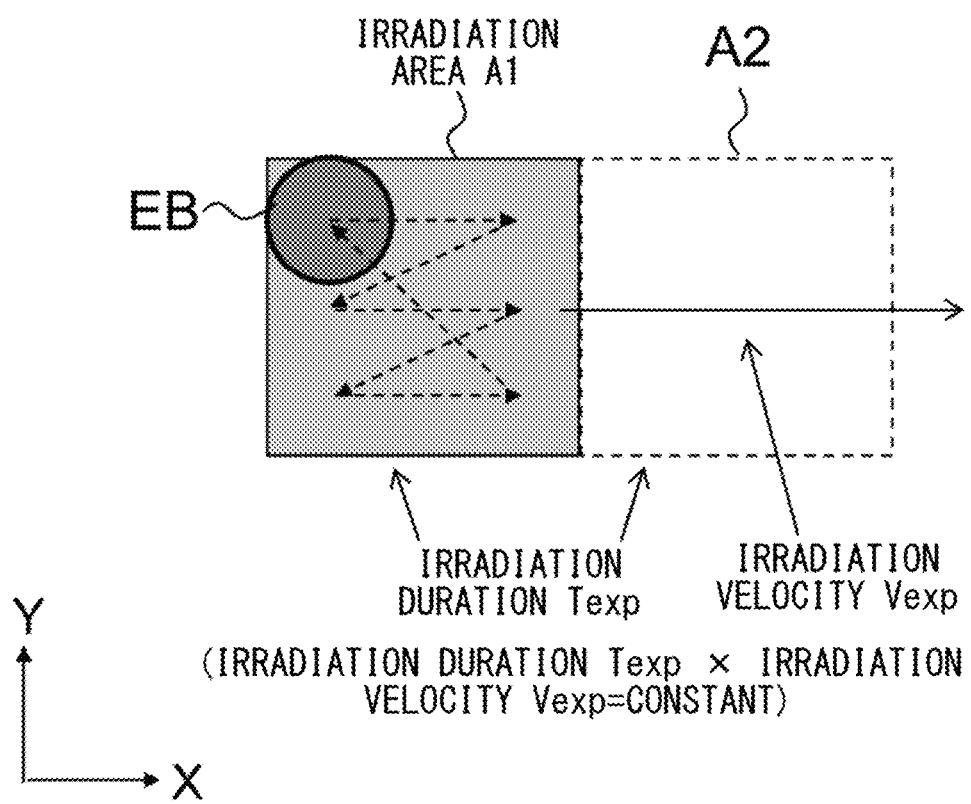
FIG. 2 shows, as an example, how a front surface 33 of a powder layer 32 is irradiated with an electron beam EB.

FIG. 2 shows, as an example, how the front surface 33 of the powder layer 32 is irradiated with the electron beam. The region indicated by "EB" in FIG. 2 corresponds to a shot (the region irradiated at a time) of the electron beam EB. In other words, the shot shown in FIG. 2 has a size corresponding to the size of the image formed by the electron beam EB at a position of the front surface 33. The size of the shot (shot size) is set similar to or smaller than the size of the powders of the source material of the powder layer 32. Here, the size of the powders of the source material means the particle size of the metal particles when the powders of the source material include only primary metal particles and means the particle size of the secondary particle when the powders of the source material include secondary particles into which a plurality of metal particles coalesce.

The irradiation areas A1, A2, . . . and the like each indicate the area that is irradiated with the electron beam EB at substantially the same time and melted. In other words, the electron beam EB is continuously applied in the present embodiment, and, for example, the irradiation area A1 is irradiated with the electron beam EB during the irradiation duration Texp in such a manner that the electron beam EB entirely fills the irradiation area A1 as indicated by the dotted lines in the irradiation area A1 and resultantly melted. The electron beam EB moves onto the next irradiation area A2 once the irradiation area A1 is melted. By repeatedly irradiating every irradiation area in the above-described manner, the three-dimensional laminating and shaping apparatus 100 increases the melted irradiation areas on the front surface 33 of the powder layer 32 at the irradiation velocity Vexp. Note that the irradiation duration Texp and the irradiation velocity Vexp are inversely proportional to each other. When one of the irradiation duration Texp and the irradiation velocity Vexp is given, the other is set.

Figure 3A:
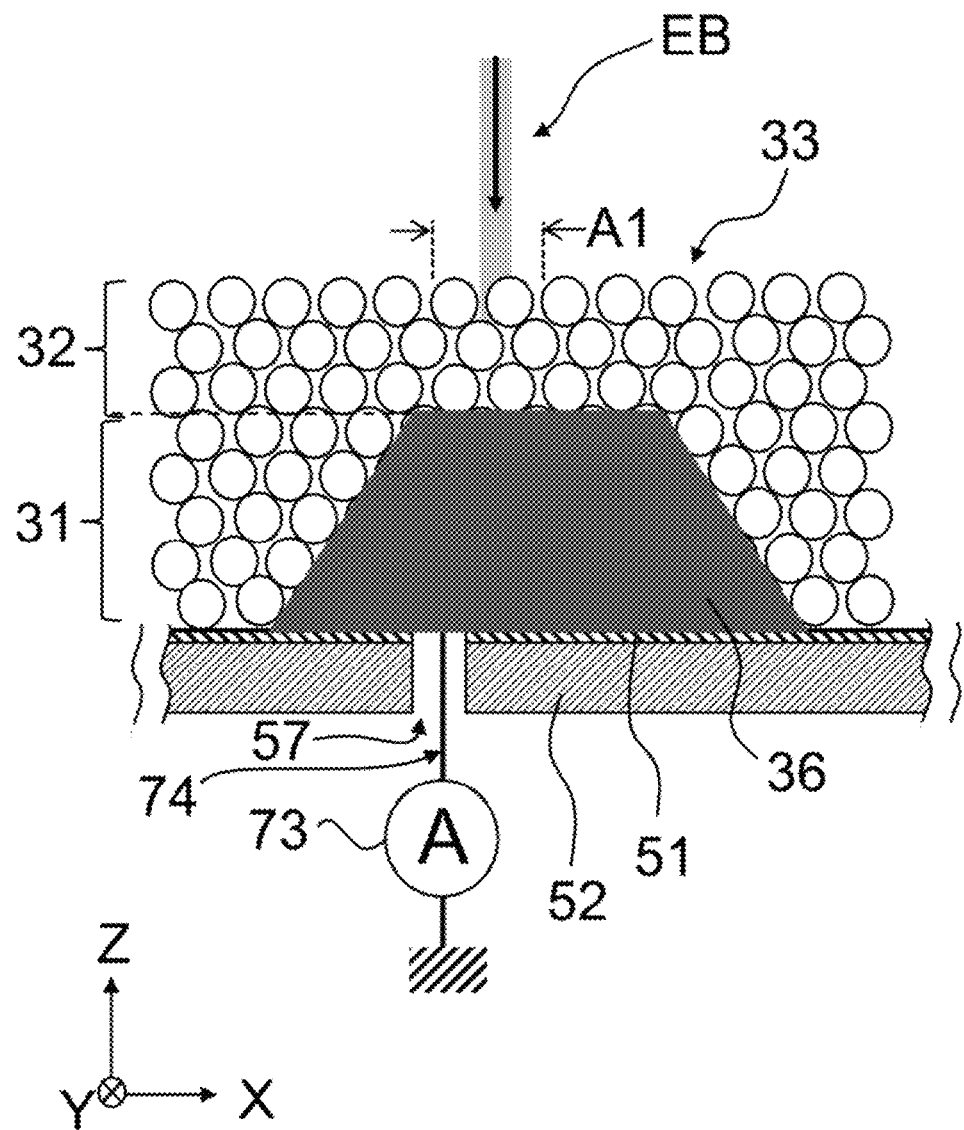
FIG. 3A shows the state of the powder layer 32 before the powder layer 32 is melted.
Figure 3B:
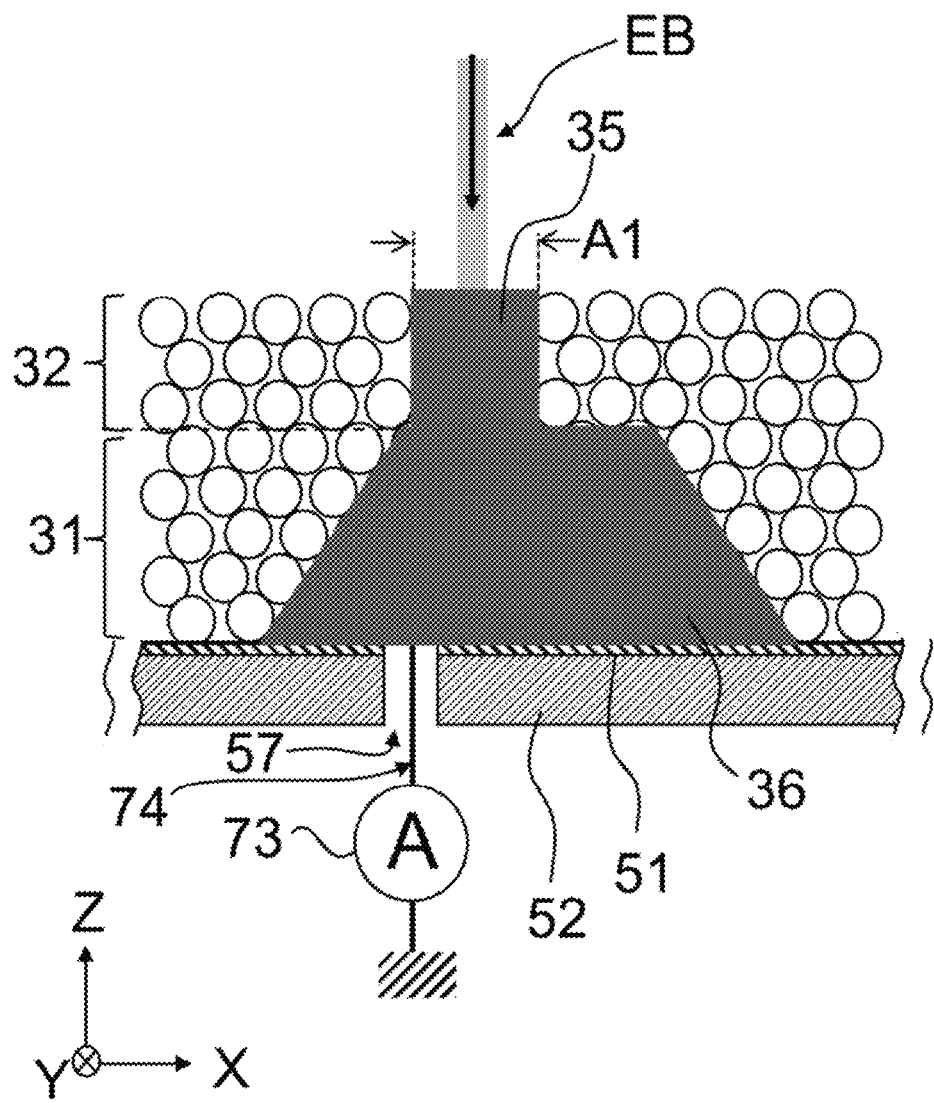
FIG. 3B shows that the powder layer 32 is melted and combined with an underlying three-dimensional structure 36.

FIG. 3A schematically shows the powder layer 32 before the powder layer 32 is melted, and FIG. 3B schematically shows the state of the powder layer 32 when the powder layer 32 has been completely melted and combined with the underlying three-dimensional structure 36. The following description is made in relation to the example where the irradiation area A1 is irradiated with the electron beam EB in the manner described with reference to FIG. 2. In FIG. 2 and the subsequent drawings, the constituents that are the same as the corresponding constituents shown in FIG. 1 are assigned with the same reference numerals as in FIG. 1 and not described again.

In the powder layer 32, the fine particles of the metal material pile up in the form of particles before the powder layer 32 is completely melted. In this state, the powder layer 32 transfers the current in such a manner that the front surfaces of the adjacent metal fine particles come into local contact with each other. The powder layer 32 exhibits lower electrical conductivity than the metal in the bulk state, into which the powder layer 32 turns by being melted and combined. Here, the bulk state means such a state of a substance that no front surfaces or interfaces are present in the substance.

When the powder layer 32 is irradiated with the electron beam EB while having the state shown in FIG. 3A, part of the beam current charges a portion of the powder layer 32 in the vicinity of the position irradiated with the electron beam EB. The remaining part of the beam current is transferred at a low current density through the powder layer 32 centering around the irradiated position. This is because the powder layer 32 exhibits low electrical conductivity in every direction therein. The beam current finally flows into the side wall unit 53, which is a member maintained at the ground potential (referred to as the ground potential member), after passing through the powder layer 32, and also partially flows into the ground potential member after passing through the three-dimensional structure 36 and the ammeter 73.

As shown in FIG. 3B, on the other hand, when the powder layer 32 has been completely melted and combined with the underlying three-dimensional structure 36, the cross-section layer 35 includes a metal in the bulk-state that connects the position irradiated with the electron beam EB and the three-dimensional structure 36. This means that the cross-section layer 35 forms a current transfer path exhibiting high electrical conductivity between the position irradiated with the electron beam EB and the three-dimensional structure 36. In this case, almost all of the beam current of the electron beam EB irradiating the cross-section layer 35, excluding the part reflected by the front surface of the cross-section layer 35, flows into the three-dimensional structure 36 after passing through the cross-section layer 35. The beam current that has flowed into the three-dimensional structure 36 flows into the ground potential member through the ammeter 73. In this way, the ammeter 73 measures the value of the beam current flowing into the ground potential member after passing through the three-dimensional structure 36.

Figure 4:
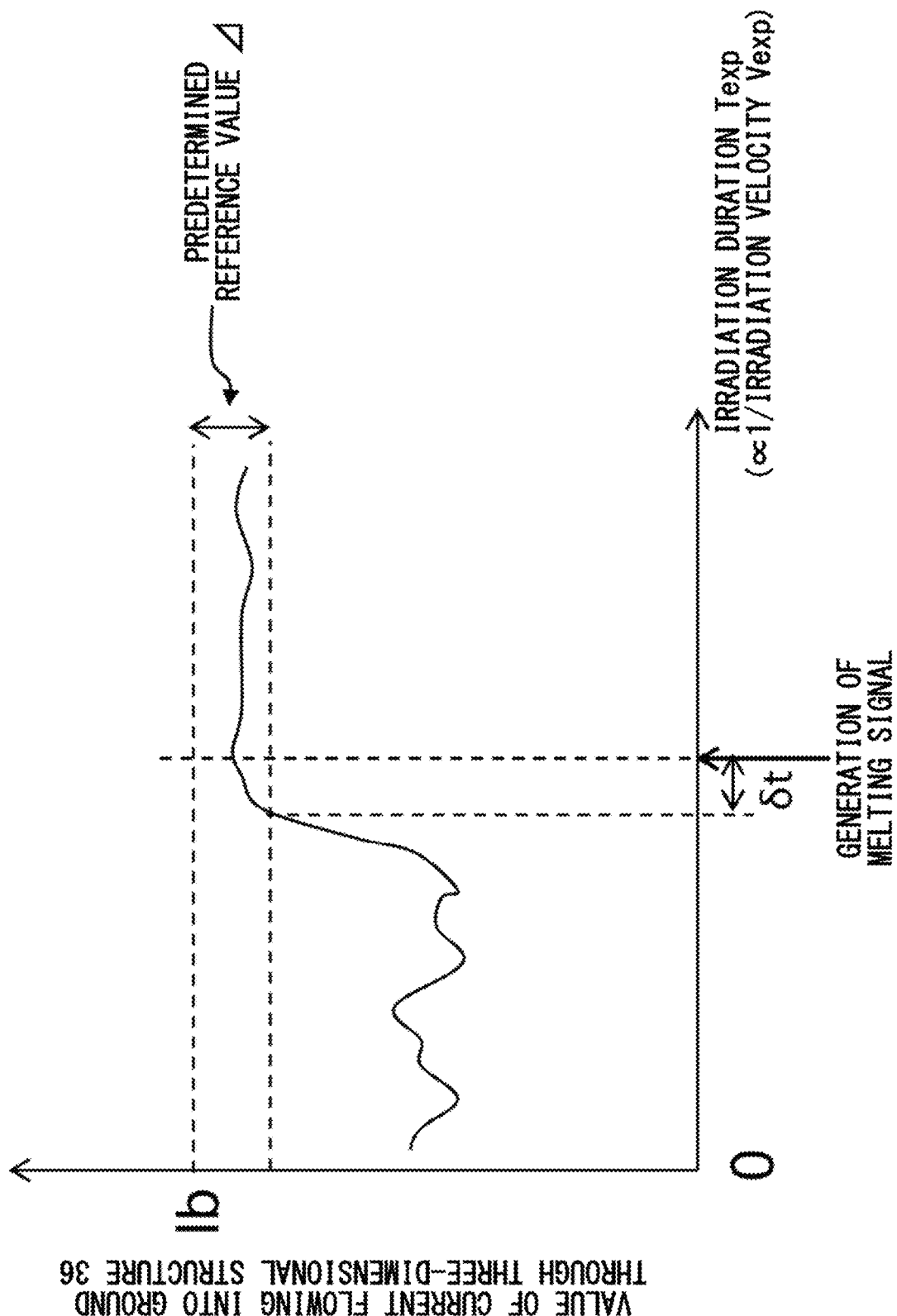
FIG. 4 is a graph showing, as an example, how the irradiation duration Texp or irradiation velocity Vexp of the electron beam EB is related to the value of the current that flows into a ground potential member after passing through a three-dimensional structure 36.

FIG. 4 is a graph showing, as an example, how the irradiation duration of the electron beam EB is related to the current value measured by the ammeter 73. The horizontal axis represents the irradiation duration Texp that has elapsed since the start of the irradiation of each irradiation area with the electron beam EB. Since the irradiation duration Texp is inversely proportional to the irradiation velocity Vexp, the direction in which the value represented by the horizontal axis of FIG. 4 increases corresponds to the direction in which the irradiation velocity Vexp of the electron beam EB decreases. The vertical axis represents the value of the beam current, which is measured by the ammeter 73, that flows into the ground potential member after passing through the three-dimensional structure 36.

As the irradiation duration Texp increases, the value of the current flowing into the ground potential member after passing through the three-dimensional structure 36 suddenly changes. The beam current that flows into the three-dimensional structure 36 significantly changes since the state of the powder layer 32 changes from the state shown in FIG. 3A to the state shown in FIG. 3B so that the cross-section layer 35 is formed, which serves as a current transfer path.

The term "Ib" marked along the vertical axis in FIG. 4 represents the beam current value of the electron beam EB irradiating the powder layer 32. The current value measured by the ammeter 73 (represented by the vertical axis in FIG. 4) approaches the current value Ib when the irradiation duration Texp increases so that the powder layer 32 is melted and turns into the state shown in FIG. 3B. This is because the electron beam EB irradiating the powder layer 32 almost entirely flows into the ground potential member after passing through the cross-section layer 35 and the three-dimensional structure 36. The difference between the current value Ib irradiating the powder layer 32 and the current value that is measured by the ammeter 73 corresponds, for example, to the current value representative of the electrons that are reflected by the front surface of the cross-section layer 35 and leaves the cross-section layer 35.

When a given period of time δt elapses after the current value measured by the ammeter 73 falls within a range defined by a predetermined reference value Δ relative to the current value Ib irradiating the powder layer 32, the powder layer 32 is believed to be always in the similarly melted state. The three-dimensional laminating and shaping apparatus 100 can successfully identify the irradiation duration after which the powder layer 32 in the irradiation area is completely melted by the irradiation with the electron beam EB and formed into the cross-section layer 35, by appropriately setting the reference value Δ and the period of time δt based on the irradiation duration after which the difference between the current value Ib irradiating the powder layer 32 and the current value measured by the ammeter 73 becomes less than or equal to the reference value Δ.

In FIG. 4, the timing indicated by the arrow (marked as "GENERATION OF MELTING SIGNAL") represents the timing at which the given period of time δt elapses after the current value measured by the ammeter 73 falls within the range defined by the predetermined reference value Δ relative to the current value Ib irradiating the powder layer 32. When the irradiation duration indicated by the arrow elapses, the powder layer 32 in the irradiation area irradiated with the electron beam EB has been completely melted, combined with the underlying three-dimensional structure 36 and transformed into the cross-section layer 35.

In the three-dimensional laminating and shaping apparatus 100 relating to the present embodiment measures, for each of the irradiation areas A1, A2, . . . , the ammeter 73 measures the value of the current flowing into the ground potential member after passing through the three-dimensional structure 36. The three-dimensional laminating and shaping apparatus 100 detects the irradiation duration defined by the arrow in FIG. 4 by measuring the value of the current flowing into the ground potential member after passing through the three-dimensional structure 36 while increasing the irradiation duration Texp of the electron beam EB. Alternatively, the three-dimensional laminating and shaping apparatus 100 may detect the irradiation velocity indicated by the arrow in FIG. 4 by measuring the value of the current flowing into the ground potential member after passing through the three-dimensional structure 36 while lowering the irradiation velocity Vexp.

Figure 5:
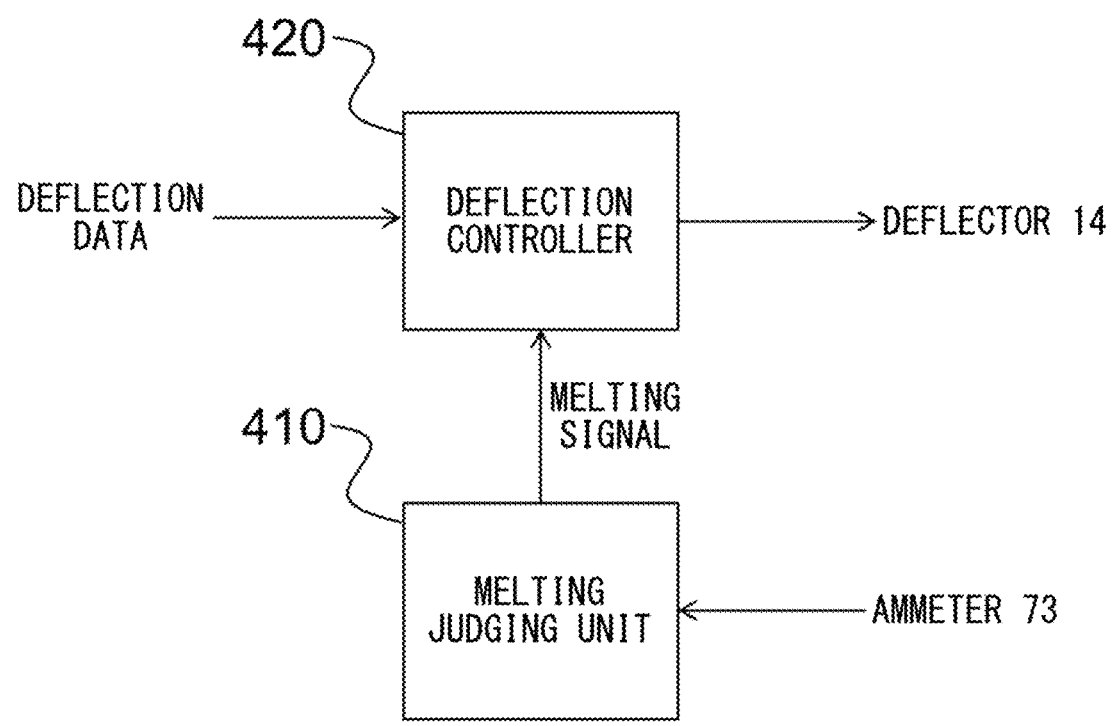
FIG. 5 is a block diagram showing an exemplary structure of (part of) a controller 400.

FIG. 5 shows the structures of the melting judging unit 410 and the deflection controller 420, which form part of the controller 400. The melting judging unit 410 receives the current value measured by the ammeter 73.

The melting judging unit 410 receives, for each of irradiation areas A1, A2, . . . (see FIG. 2) in the powder layer 32 irradiated with the electron beam EB, the current value that is representative of the current flowing into the ground potential member after passing through the three-dimensional structure 36 and measured by the ammeter 73 while increasing the irradiation duration Texp. The melting judging unit 410 identifies the timing at which the difference between the current value Ib irradiating the powder layer 32 and the current value measured by the ammeter 73 becomes less than or equal to the predetermined reference value Δ and generates a melting signal when a given period of time δt elapses after the identified timing. The melting judging unit 410 outputs the generated melting signal to the deflection controller 420.

Here, instead of measuring the difference between the current value Ib irradiating the powder layer 32 and the current value measured by the ammeter 73 while increasing the irradiation duration Texp, the melting judging unit 410 may measure the difference in current value while lowering the irradiation velocity Vexp and generate the melting signal.

The deflection controller 420 receives the melting signal and outputs to the deflector 14 deflection data used to deflect the electron beam to the next irradiation area. In this way, the three-dimensional laminating and shaping apparatus 100 relating to the present embodiment detects that the powder layer 32 is melted and combined in each irradiation area in the powder layer 32, thereby expanding the area that has been irradiated with the electron beam.

Figure 6:
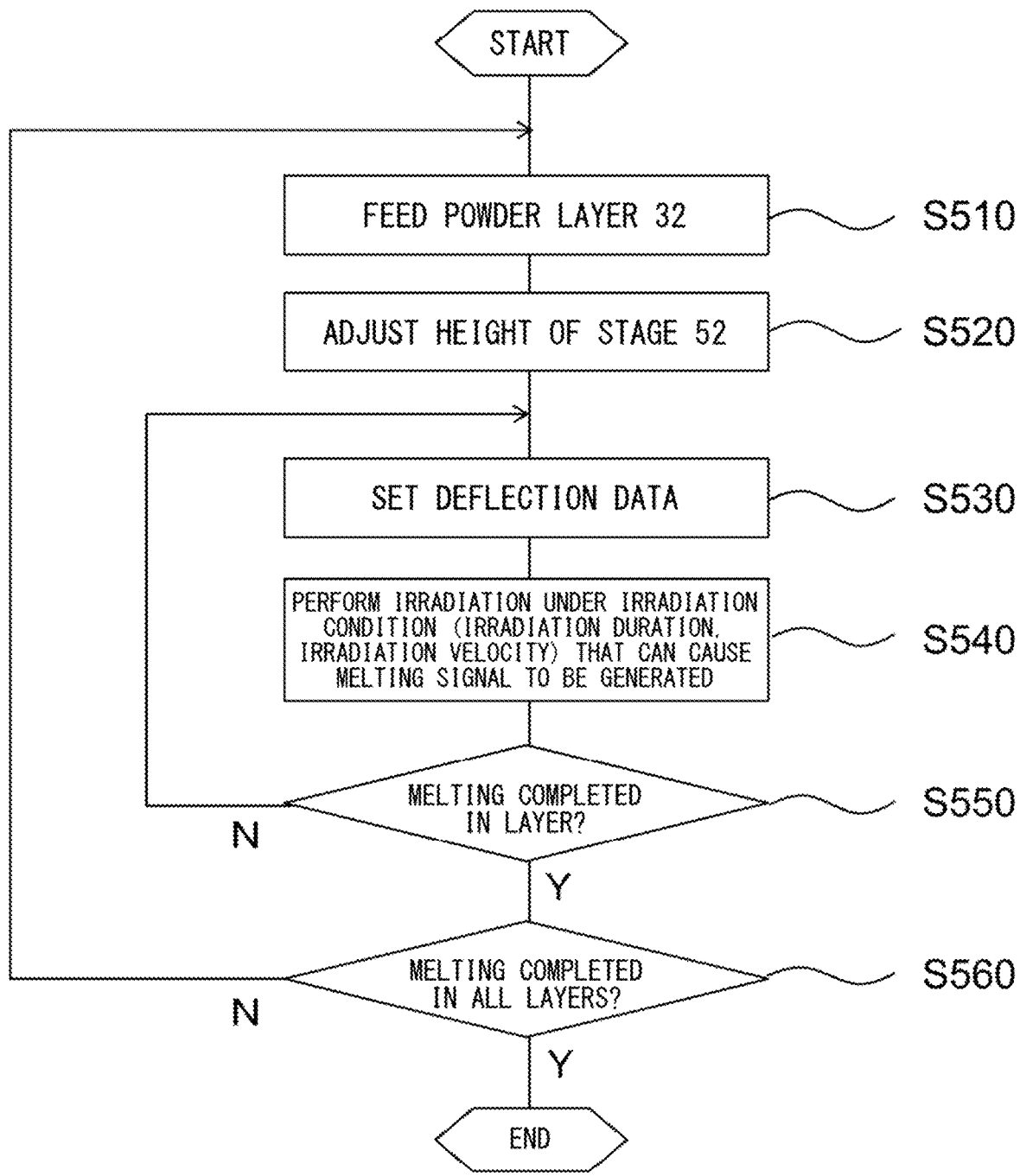
FIG. 6 shows an exemplary flow of operations for a laminating and shaping method of the three-dimensional laminating and shaping apparatus 100.

FIG. 6 shows an exemplary flow of operations for a laminating and shaping method of the three-dimensional laminating and shaping apparatus 100 having the above-described configurations.

In the three-dimensional laminating and shaping apparatus 100, the powder feeding unit 34 feeds the powders of the metal materials from (S510). The three-dimensional laminating and shaping apparatus 100 feeds the powder layer 32 that has been flattened to be substantially parallel to the upper surface of the stage 52. Here, the steps S510 and S520 may be performed in the reversed order.

Subsequently, the three-dimensional laminating and shaping apparatus 100 adjusts the height of the stage 52 (S520). The three-dimensional laminating and shaping apparatus 100 adjusts the height of the stage 52 in the Z-axis direction in such a manner that the height of the front surface 33 of the newly fed powder layer 32 is the same as the predetermined height of the electron beam irradiation plane.

The three-dimensional laminating and shaping apparatus 100 uses the deflection controller 420 to output deflection data to the deflector 14 based on the shape data of the three-dimensional structure 36 and sets an irradiation area on the front surface 33 of the powder layer 32 (S530).

While irradiating the set irradiation area with the electron beam, the three-dimensional laminating and shaping apparatus 100 uses the ammeter 73 to perform the measurement and output the measured results to the melting judging unit 410. The melting judging unit 410 generates a melting signal for the irradiation area based on the measured results indicating the value of the current flowing into the ground potential member after passing through the three-dimensional structure 36. The three-dimensional laminating and shaping apparatus 100 continues irradiating the irradiation area until the melting signal is generated (S540).

The three-dimensional laminating and shaping apparatus 100 judges whether all of the melting operations have been completed in the layer same as the powder layer 32, which is irradiated in the step S540 (S550).

If all of the melting operations have not been completed in the layer same as the powder layer 32 (S550: No), the three-dimensional laminating and shaping apparatus 100 uses the deflector 14 to deflect the electron beam to irradiate a new irradiation area with the electron beam (S530 to S540). If all of the melting operations have been completed in the layer same as the powder layer 32 (S550: Yes), the three-dimensional laminating and shaping apparatus 100 judges whether all of the cross-section layers 35 required to form the three-dimensional structure 36 have been laminated (S560).

If all of the cross-section layers have not been laminated (S560: No), the three-dimensional laminating and shaping apparatus 100 feeds a new powder layer 32 (S510) and performs a laminating and shaping operation on the next powder layer 32 (S520 to S550). If all of the cross-section layers have been laminated (S560: Yes), the three-dimensional laminating and shaping apparatus 100 completes the laminating and shaping operations for the three-dimensional structure 36.

By performing the laminating and shaping method indicated by the exemplary flow of operations in FIG. 6, the three-dimensional laminating and shaping apparatus 100 can detect that the powder layer 32 is melted and combined for every irradiation area in every powder layer 32 while laminating the cross-section layers 35.

As described above, the three-dimensional laminating and shaping apparatus 100 relating to the present embodiment can determine on its own such irradiation conditions that can ensure that the powder layer 32 is melted and combined while shaping a three-dimensional structure by the irradiation with the electron beam EB.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

12: electron source, 13: electron lens, 14: deflector, 31: powder, 32: powder layer, 33: front surface, 34: powder feeding unit, 35: cross-section layer, 36: three-dimensional structure, 51: insulating portion, 52: stage, 53: side wall unit, 54: driving unit, 55: driving rod, 56: evacuating unit, 57: through hole, 71: radiation thermometer, 73: ammeter, 74: cable, 100: three-dimensional laminating and shaping apparatus, 200: column unit, 300: shaping unit, 400: controller, 410: melting judging unit, 420: deflection controller

What is claimed is:

1. A three-dimensional laminating and shaping apparatus to laminate and shape a three-dimensional structure, comprising:
   a shaping unit having an evacuator configured to maintain a powder layer of an electrically conductive material;
   an electron beam column configured to output an electron beam and deflect the electron beam toward an irradiation area on a top surface of the powder layer to be melted onto the three-dimensional structure;
   an insulator that is in contact with the three-dimensional structure and electrically insulates the three-dimensional structure from an earth ground;
   an ammeter connected between the three-dimensional structure and the earth ground and configured to measure a current value of a beam current flowing from the electron beam into the earth ground after passing through the three-dimensional structure;
   a melting judging unit having a program configured to detect that the irradiation area on the top surface of the powder layer has converted from powder form to a solid form melted onto the three-dimensional structure, based on the current value of the beam current measured by the ammeter, and generate a melted powder form signal; and
   a deflection controller configured to receive the melted powder form signal and determine another irradiation area on the top surface of the powder layer to be irradiated with the electron beam.

2. The three-dimensional laminating and shaping apparatus as set forth in claim 1, wherein
   the deflection controller repeatedly performs irradiation with the electron beam in each of a plurality of additional irradiation areas that are obtained by dividing a cross-section of the three-dimensional structure, and each of the plurality of additional irradiation areas is irradiated by moving a shot of the electron beam for a predetermined period of time to fill each of the plurality of additional irradiation areas with the shot of the electron beam.

3. The three-dimensional laminating and shaping apparatus as set forth in claim 2, wherein based on a timing at which a difference between a current value of the electron beam irradiating the irradiation area on the top surface of the powder layer and the current value of the beam current measured by the ammeter becomes less than or equal to a predetermined reference value, the melting judging unit generates the melted powder form signal for the irradiation of each of the plurality of additional irradiation areas with the electron beam.

4. The three-dimensional laminating and shaping apparatus as set forth in claim 3, wherein the deflection controller controls continuation of the irradiation of each of the additional irradiation areas with the electron beam until the melted powder form signal is received.

5. The three-dimensional laminating and shaping apparatus as set forth in claim 4, wherein the insulator is made of an insulating ceramic.

6. The three-dimensional laminating and shaping apparatus as set forth in claim 2, wherein the insulator is made of an insulating ceramic.

7. The three-dimensional laminating and shaping apparatus as set forth in claim 3, wherein the insulator is made of an insulating ceramic.

8. The three-dimensional laminating and shaping apparatus as set forth in claim 1, wherein the insulator is made of an insulating ceramic.

9. A laminating and shaping method for a three-dimensional structure, performed by a three-dimensional laminating and shaping apparatus including a powder feeder configured to feed a powder layer of an electrically conductive material, an electron beam column configured to output an electron beam and deflect the electron beam toward a front surface of the powder layer, an insulating portion that is in contact with the three-dimensional structure and electrically insulates the three-dimensional structure from a ground potential member, an ammeter connected between the three-dimensional structure and the ground potential member and configured to measure a current value of a current flowing into the ground potential member after passing through the three-dimensional structure, a melting judging unit configured to, based on the current value measured by the ammeter, detect that the powder layer is melted and generate a melted powder form signal, and a deflection controller configured to receive the melted powder form signal and determine a condition of irradiation with the electron beam, the laminating and shaping method comprising:

by the powder feeder, feeding the powder layer;

by the electron beam column, irradiating the powder layer with the electron beam;

by the ammeter, measuring the current value of the current flowing into the ground potential member after passing through the three-dimensional structure;

by the melting judging unit having a program, generating the melted powder form signal based on a timing at which a difference between a current value of the electron beam irradiating the powder layer and the current value measured by the ammeter becomes less than or equal to a reference value; and by the deflection controller, setting a condition of the irradiation based on the melted powder form signal.

* * * * *